E. STONE.
LAMP-TRIMMER.
No. 193,052. Patented July 10, 1877.
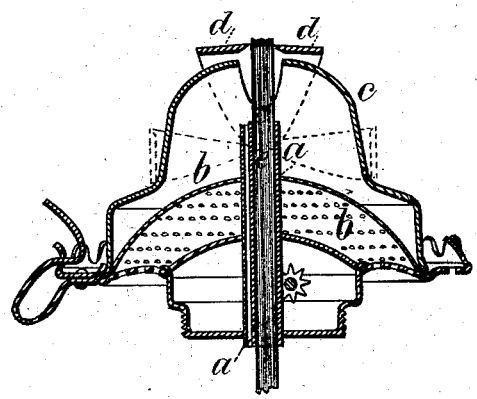
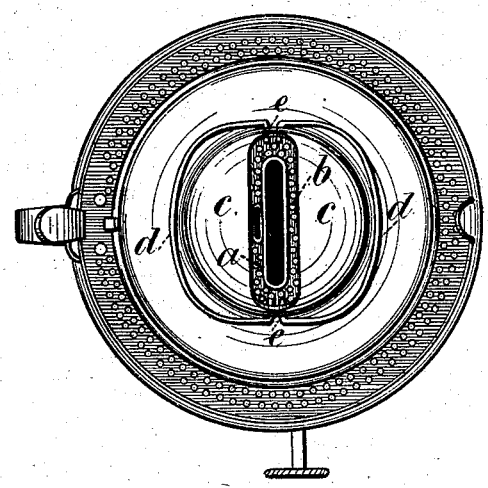

UNITED STATES PATENT OFFICE.

EATON STONE, OF FRANKLIN, NEW JERSEY.

IMPROVEMENT IN LAMP-TRIMMERS.

Specification forming part of Letters Patent No. 193,052, dated July 10, 1877; application filed March 16, 1877.

*To all whom it may concern:*

Be it known that I, EATON STONE, of Franklin, in the county of Essex and State of New Jersey, have invented an Improvement in Lamp-Trimmers, of which the following is a specification:

In an application for a patent filed by me December 11, 1876, a lamp-trimmer is represented, having two plates united together by a spring, and between which the lamp-wick is compressed while the burnt portion is being removed. My present invention is an improvement upon the same, and relates to a trimmer hinged to the lamp cone or deflector, so as to be swung up the outside of the cone and grasp the wick that is projected above such cone and pinch off the crust or carbonaceous matter of the wick, and form said wick into the proper shape to produce a flame without smoke.

In the drawing, Figure 1 is a plan of a burner with the trimmer attached, and Fig. 2 is a section transversely of the same.

The wick-tube $a$, air-distributer $b$, and cone $c$ are to be of any desired make or size.

The trimming-blades $d\ d$ are adapted to be horizontally, or nearly so, around the cone when not in use, and the blades $d$ are united to the cone by pivot-pins $e$ at their respective ends, so as to be out of the way when the lamp is in use, but be capable of being turned up over the cone when employed to trim the lamp.

The operator elevates the wick, so that the end is above the deflector. He then grasps the wick between the trimmer, and with a cloth or scissors the carbonaceous crust is removed to a shape corresponding to that of the trimmer.

It is generally preferable to make the contiguous edges of the blades sharp, so as to pinch off the carbonaceous crust by pressing the trimmers together by the finger and thumb after the wick has been raised to the proper height, and then to remove the carbonaceous crust from above the trimmer before opening the same, so as to prevent any pieces of carbon falling into the burner, thus keeping the parts clean.

I claim as my invention—

A lamp-trimmer consisting of two blades, pivoted to the slotted cone or deflector of the lamp, and closing together above such cone, substantially as set forth.

Signed by me this 6th day of March, A. D. 1877.

EATON STONE.

Witnesses:
 GEO. T. PINCKNEY,
 CHAS. H. SMITH.